United States Patent
Helbig, Sr.

[11] Patent Number: 5,841,868
[45] Date of Patent: Nov. 24, 1998

[54] TRUSTED COMPUTER SYSTEM

[76] Inventor: Walter Allen Helbig, Sr., 186 Nahma Trail, Medford Lakes, Burlington, N.J. 08055

[21] Appl. No.: 124,954

[22] Filed: Sep. 21, 1993

[51] Int. Cl.[6] .............................. H04L 9/32; H04L 9/00
[52] U.S. Cl. ........................ 380/25; 380/23; 380/49; 380/50; 235/380; 235/382; 340/825.31; 340/825.34
[58] Field of Search .................. 380/22–25, 49, 380/50, 59; 340/825.31, 825.34; 235/379, 380, 382

[56] References Cited

U.S. PATENT DOCUMENTS

| | | | |
|---|---|---|---|
| 3,764,742 | 10/1973 | Abbott et al. | 380/23 |
| 4,138,057 | 2/1979 | Atalla | 235/380 |
| 4,138,058 | 2/1979 | Atalla | 235/380 |
| 4,635,053 | 1/1987 | Banks et al. | 340/825.31 |
| 4,951,249 | 8/1990 | McClung et al. | 340/825.34 X |
| 5,083,309 | 1/1992 | Beysson | 380/4 |
| 5,093,861 | 3/1992 | Graham | 380/23 |
| 5,153,918 | 10/1992 | Tuai | 380/25 |
| 5,233,658 | 8/1993 | Bianco et al. | 380/25 |

*Primary Examiner*—Bernarr Earl Gregory
*Attorney, Agent, or Firm*—William H. Meise

[57] ABSTRACT

A trusted computing system includes a computer, responsive to signals applied to its keyboard port. The system includes a keyboard for generating signals representing keystrokes. A card reader is coupled to the keyboard and to the computer keyboard port. The card reader couples one of a plurality of removable access control cards to the keyboard and to the computer keyboard port. Each of the access cards includes memory for storing personal identification information of the user to whom the card is issued. Within the card, a comparator is coupled to the memory, for, in a first operating mode, comparing the keyboard signals with the personal identification information stored in the card memory, and for, when the comparator matches the keyboard signals with the personal identification information, switching to a second operating mode, in which it couples the keyboard to the keyboard port of the computer. The system is secure, even against an unauthorized person controlling an access card, because no keyboard signals reach the computer itself until the personal information is verified by the card. Only an access card, together with knowledge about the information stored in its memory, can provide access. The information cannot be retrieved from the card itself. The invention provides positive separation of the user's private information from the computer, and does not allow this user to gain access to the computer software unless the private sign-on information is provided during the start-up process.

3 Claims, 3 Drawing Sheets

TRUSTED COMPUTER SYSTEM

This invention relates to computer systems, and more particularly to stand-alone computers or to local networks of computers, in which security against unauthorized access is provided.

Large numbers of general-purpose personal computers are currently in use, and their numbers are increasing. There are often situations in which the memories of computers are loaded with sensitive data, whether of a business or a governmental nature, which should be kept private. For the most part, these personal computers are physically available to anyone who happens to be in the area. All such computers in common use include a lock physically attached to the device, which in general acts to lock out the hard disk or to prevent energization of the computer. This key makes the computer's information inaccessible to unauthorized access without physical disassembly of the box, which disassembly, in the context of an office in operation, presumably cannot be accomplished surreptitiously. However, the keys for such locks may be misplaced or "borrowed" and returned, thereby allowing ready access to an unauthorized user. Also, such keys are not particularly advantageous when the computer is to be operated by more than one user at different times during the day. When use by more than one party is contemplated, the keys cannot be readily controlled, and the computer is likely to be left unlocked. Instead of a physical key, the information on an operating personal computer may be protected against accidental or covert access by use of software codes, but such codes are part of the computer programming, and some such codes may be discovered by an unauthorized accessor by simply examining the files of the access-protecting program. More sophisticated access-protecting programs may themselves be difficult to penetrate, but their protection may readily be overcome by surreptitious addition to memory of a program which, for example, records the keystrokes made on the keyboard by an authorized user who knows the access code, whereupon the unauthorized accessor has merely to return at a later time, and examine the keystrokes recorded by his program, in order to determine the access codes. These problems of providing convenient access to authorized users, while denying access to unauthorized users, become more difficult in the context of local area networks (LAN), in which many such personal computers, and their sensitive data banks, are linked together for common use by two or more authorized users.

A current Government Project is directed toward a smart encryption/description engine built into a PCMCIA memory card. In the planned system, the card will be inserted as a peripheral unit on one of the computer's input/output (I/O) ports or directly onto the computing system's internal bus as an extension to its internal read/write memory. The card is then operated under Operating System control to process the user-entered personal identification information to provide positive proof of the user's identity and operating clearance. The engine is used at the beginning of each session of operations by following a protocol which requires that the user provide personal information to be processed in the engine prior to activating the applications program(s) to which the user wants access. As presently constituted, each application program requiring a particular level of clearance must perform a pre-operation security check of the user before access to the program is permitted. The principal use to which the planned system is applied is to electronic mail. In the electronic mail context, the planned system first requires that the transmit user establish his right to use the program at a certain level of security, following which the transmitter is allowed to communicate with a second party, but at a level of security which does not exceed the highest common level of clearance of the two parties. In the planned system, the personal information required to establish the user's identity and security clearance level is pre-stored in the user's own PCMCIA engine card. Once the card is connected to the host computing system to be used to establish identity and clearance in order to obtain access to electronic mail, the information initially goes through the host computing system, as described above, which is unsecured, and susceptible to covert recordation. Once the personal information has been recorded, all that is required is to gain temporary access to the card in order to access the supposedly secure system.

While new personal computer systems which provide appropriate access protection may become available in the future, there is a large base of existing personal computers which are satisfactory in that they are capable of performing the function of general-purpose computing, but which suffer from the above-described problems of susceptibility to unauthorized access. A protective scheme is desired, which can be used as an add-on to protect the current base of personal computers and which can also be used, if desired, with new generations of computers.

SUMMARY OF THE INVENTION

A trusted computing system according to the invention includes a general-purpose computing apparatus with a keyboard port adapted to be coupled to a keyboard, and which is responsive to signals applied to the keyboard port to perform its function. The system also includes a keyboard with a plurality of keys and an output port, for generating keyboard signals representing keystrokes at the output port of the keyboard. A dumb card reader is coupled to the output port of the keyboard and to the keyboard port of the computing apparatus. The dumb card reader is adapted for coupling a removable access control card to the keyboard output port and to the keyboard port of the computing apparatus, and in one embodiment of the invention is also arranged for powering the access control card. The system according to the invention also includes a plurality of removable access cards adapted to be coupled to the dumb reader. Each of the access cards includes memory adapted for storing personal identification information such as a personal identification number of the authorized user to whom the card is issued. Within the card, a comparator is coupled to the memory, for, in a first mode of operation, comparing the keyboard signals with the personal identification information stored in the card memory, and for, when the comparator matches the keyboard signals with the personal identification information, switching to a second mode of operation, and for, in the second mode of operation, coupling the keyboard signals to the keyboard port of the computing apparatus. The system is secure, even against an unauthorized person who gains control of an access card, because no keyboard signals reach the computer itself until the personal information is verified by the card. Only an access card, together with knowledge about the information stored in the card's memory, can provide access. The information cannot be retrieved from the card itself by operation thereof, and disassembly of the card destroys the recorded information. Thus, the invention provides positive and definite separation of the user's private information from the host computer, and does not allow this user to gain access to the host computer software unless the private sign-on information is provided during the start-up process.

DESCRIPTION OF THE INVENTION

Figure 1:
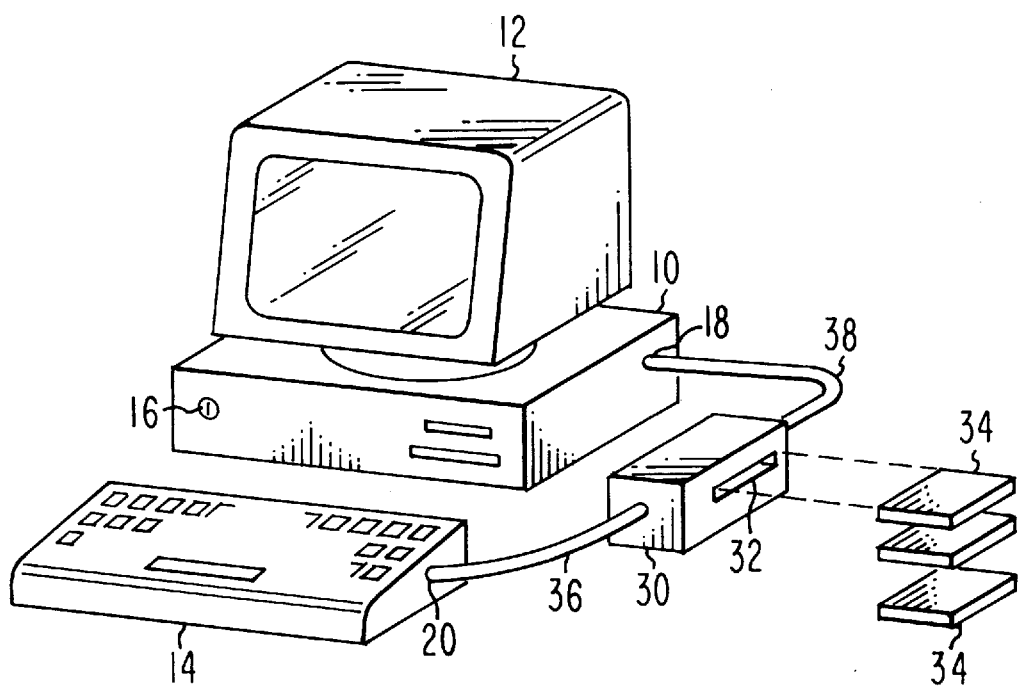
FIG. 1 is a simplified block diagram of a trusted general-purpose computing system according to the invention, which includes a card reader and a plurality of access cards.

In FIG. 1, a housing 10 holds the processors, memories and hard disks of a general-purpose "personal" computer (computer). A monitor 12 is associated with computer 10 in known fashion, and a keyboard 14 is supplied therewith, which is associated with a port 20 at which keyboard signals are generated in response to keystrokes; in some cases the keyboard is equipped with an interconnection cable, and the keyboard port may in that case be conceived of as being at the keyboard end of the cable. As is common in such arrangements, computer 10 is equipped with a lock 16 and a keyboard connection port 18, shown on the side of the housing rather than on the back for simplicity of illustration. In prior art arrangements, keyboard port 20 is connected to keyboard input port 18 of computer 10 by a cable. In accordance with an aspect of the invention, a "dumb" card reader 30 is connected in the cable or line between keyboard 14 output port 20 and keyboard input port 18 of computer 10. Card reader 30 includes a slot 32 which accepts a plurality of access cards, some of which are illustrated as 34. A first interconnection cable 36 connects card reader 30 to keyboard 14 output port 20, and a second cable 38 interconnects the card reader to keyboard input port 18 of computer 10.

According to an aspect of the invention, each card 34 of FIG. 1 includes at least a memory and a comparator, as described below. The memory of a card is loaded, as described below, with personal information, such as a personal identification number, which is known only to the person to whom the card is issued, and possibly to the supervisor of the local area system of which the cardholder's computer is a part. The card, when inserted into the reader, causes the computer to enter a simple display program to display accessing instructions. It should be emphasized that the keystrokes themselves do not reach keyboard input port 18 of computer 10. Pursuant to the displayed instructions, the user keys in his personal information, which the card compares with the memorized information. If the keyed-in information matches the memorized information, the card then couples keyboard port 20 to keyboard signal input port 18 of the computer, so that the computer may be accessed from the keyboard.

Figure 2:
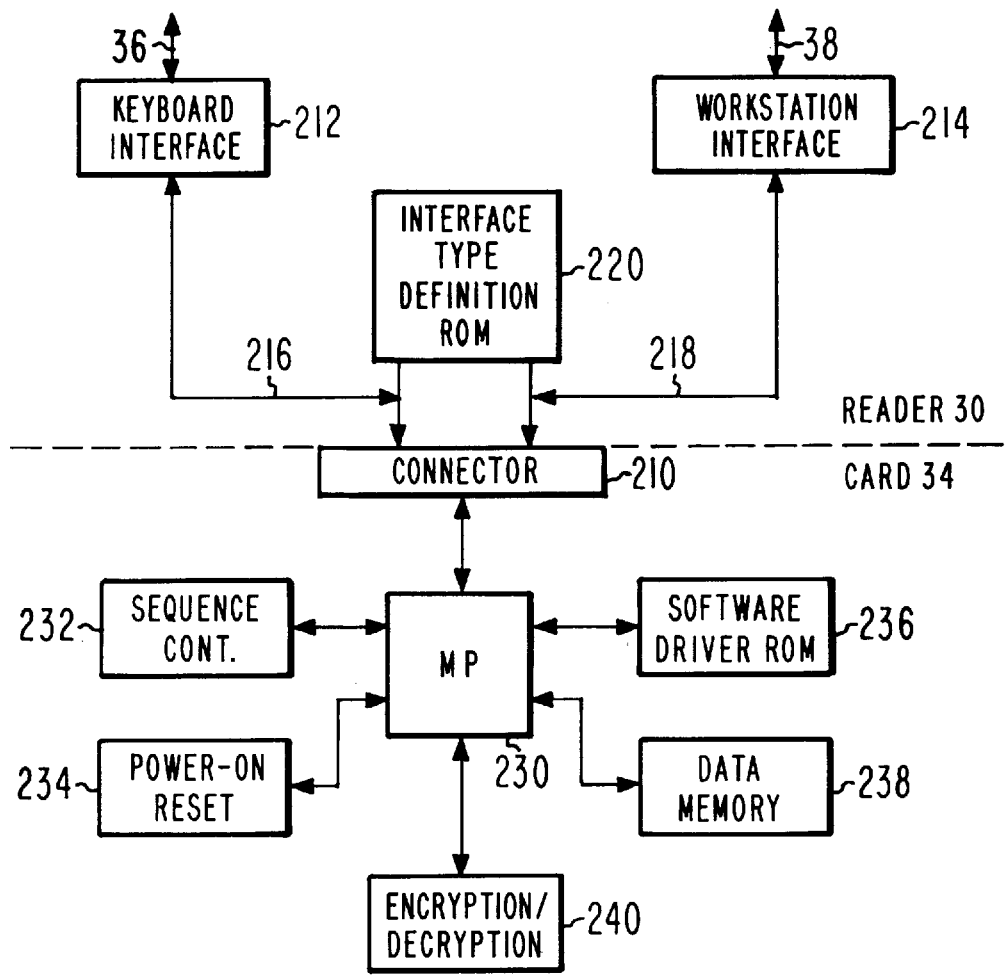
FIG. 2 is a simplified block diagram of the card reader and a card of FIG. 1.

FIG. 2 is a simplified block diagram of card reader 30 and a card 34 of FIG. 1. In FIG. 2, a connector 210 defines the interface between card 34 and reader 30. Within card reader 30, a keyboard interface or driver 212 provides coupling between reader 30 and the external keyboard 14, to which driver 212 is coupled by data path 36. Also within card reader 30, a workstation interface or driver 214 provides coupling between reader 30 and computer 10 by way of data or information path 38. Connector 210 may have a large number of pins, eight of which are connected to keyboard interface 212 for data communication through a data path 216. Path 216 also provides for the use of these same eight pins, or for the use of other pins, for data transfer from interface type definition ROM 220. Path 216 also connects to other pins for use to transfer other signals for such housekeeping functions as enable signals, clock and other timing signals, voltage and ground references. ROM 220, which may simply be a series of hard-wired jumpers at the inputs of the circuitry that connects it to path 216, identifies the type of workstation and the type of keyboard to which card reader 30 is connected; it is set at the time the reader is installed.

Card 34 of FIG. 2 includes a microprocessor ($\mu$P) 230, which is coupled to a plurality of memories, which are a sequence control memory 232, a software driver ROM 236, a nonvolatile data memory 238, and is also coupled to a power-on reset 234 and an encryption-decryption device 240. Power-on reset 234 is simply an initializer, which initializes sequence control 232 to its desired starting point, which may be zero, when power is applied as a result of insertion of card 34 into reader 30. Software driver ROM 236 is preloaded with information relating to all of the possible combinations that can be specified by the hard-wired interface information derived from ROM 220 of card 34, i.e. the requirements imposed by the keyboard interface 212 and by the workstation interface 214. The non-volatile data memory 238 contains information relating to the personal information of the authorized holder of the card. Encryption-decryption device (encryptor) 240 applies a predetermined encryption algorithm to a word supplied from microprocessor 230, and returns it to the microprocessor. Encryptor 240 may be a hard-wired device, or it may be performed by software in microprocessor 230 under the control of an encryption information memory, not illustrated in FIG. 2. The memories of card 34 may be in the form of ROMs, RAMs maintained by a battery, or they may be EEPROMs. If the data is to be erased after a predetermined number of access attempts, the memories should be RAMs or EEPROMS, so that they may be erased.

Initially, when computer 10 of FIG. 1 is energized and booted, the booting operation often "looks" for the presence of a keyboard, by sending an interrogatory character over data path 38 to where it "thinks" the keyboard should be. However, since no card is inserted, or if a card is inserted, it has not provided a path between data paths 36 and 38, no keyboard is actually coupled to the computer. This might result in a failure to complete the booting. In order to allow the computer booting to be completed, workstation interface 214 of FIG. 2 must also include a circuit, similar to those ordinarily found in keyboards, for responding positively to the interrogatory from computer 10; such circuits are well known to those skilled in the art.

Near the time at which the booting of computer 10 is completed, it will, if so commanded by memorized instructions (Autoexec.bat, in the case of an IBM-style system), initialize one of the application programs. In the system of FIGS. 1 and 2, the application program so selected is a first, access display program which displays a first of the screen instructions for obtaining access by means of a card 34, and it simply displays a screen which reads "INSERT CARD" or words of like import. This is the state in which a potential user is likely to initially find the system.

When a potential user properly in custody of an authorization card 34 wishes to use the system, he inserts the card into reader 30 so that connection is made at connector 210 of FIG. 2, which results in application of power to card 34, which results in initialization of power-on reset circuit 234. Power-on circuit 34 initializes information in microprocessor 230 which results in addressing a sequence of addresses in sequence memory 232, which in turn results in the logic sequence represented by FIG. 3.

Figure 3:
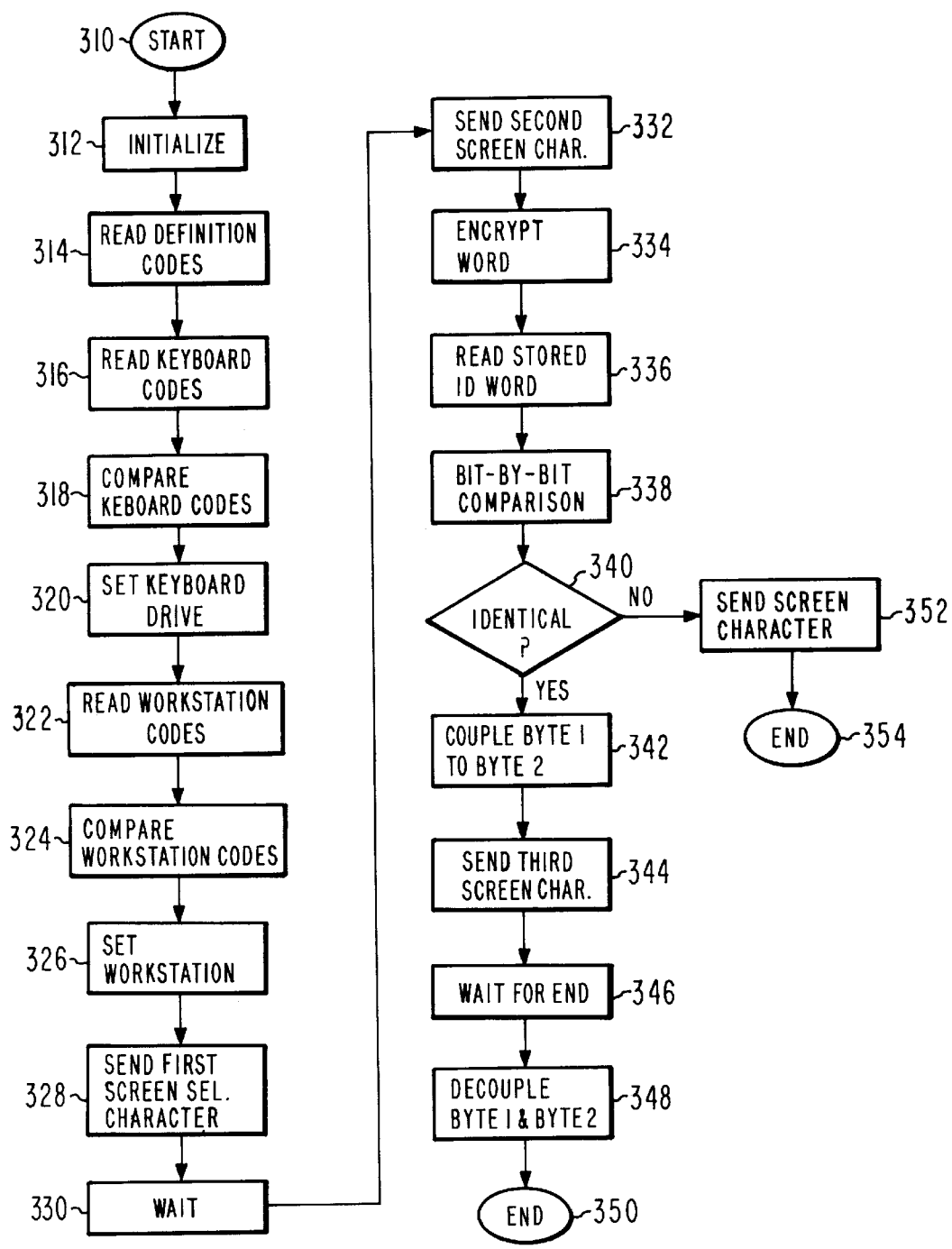
FIG. 3 is a flow chart illustrating the operation of the reader and card of FIG. 2.

In FIG. 3, the logic flow begins at a START block 310, and flows to an INITIALIZE block 312, in which the various flags and process variables are set to their initial states. From block 312, the logic flows to a block 314, representing reading of the TYPE DEFINITION codes, from Type Definition Code ROM 220 when the card is inserted. As mentioned, these codes identify the type of keyboard and computer which are coupled to the card reader. From block 314, the logic flows to a block 316, which represents a selection of the keyboard component of the definition codes. Block 318 represents a series of "if . . . else" statements which, in conjunction with the information stored in memory 236 of FIG. 2, selects an interface standard with which to drive keyboard interface 212 to properly communicate with the particular keyboard in use. Block 320 represents the setting of the keyboard standard. In a similar manner, block 322 represents selection of the workstation component of the definition code, block 324 represents the "if . . . else" statements which, in conjunction with memory 236 of FIG. 2, selects an interface standard appropriate to control workstation interface block 214 to effect communication with computer 10. Block 326 represents setting of the workstation driver interface standard.

Continuing with the access control flow chart of FIG. 3, once communications are possible between microprocessor 230 of FIG. 2 and computer 10 of FIG. 1, the logic of FIG. 3 flows from block 326 to a further block 328, which represents sending a message consisting of one or more characters from microprocessor 230 to computer 10, which starts a second access display program, to thereby replace the INSERT CARD screen of the first access display program with the first screen of the second access display program, which states ENTER PERSONAL IDENTIFICATION CODE, or words of like import. After sending the character in block 328, the logic reaches a WAIT block or interrupt 330. The logic waits in this state until a character is received from keyboard interface 212 of FIG. 1. This character originated from the keyboard 14, but cannot reach computer 10, because it must pass through microprocessor 230, which is not in a state in which it so couples the characters received from keyboard driver 212. When characters are received, they are deemed to be part of the personal identification code or number, and are temporarily stored in a buffer in microprocessor 230. When the ENTER character is received, the personal identification code is deemed to be complete, and the logic reaches block 332, representing the sending of a message consisting of one or more characters to computer 10 for causing the access display program to display a screen that states PLEASE WAIT WHILE YOUR TRANSACTION IS PROCESSED, to thereby indicate to the user that the code has been received and is being evaluated.

From block 332, the logic flows to a block 334, which represents the application of the personal code to encryption device 240 of FIG. 2. In general, the encryption device is capable of encrypting a large word, on the order of 50 or more bytes in length. Ordinarily, a personal code or number will not exceed a dozen or so characters, so the encoding process includes the process of padding the number with additional characters, such as trailing zeroes. It may be desirable to have a different padding algorithm for each individual card for maximum security, or for reduced cost the algorithms may be the same. However padded, the padded personal number is encrypted, and the encrypted number is returned to microprocessor 230. Logic block 336 of FIG. 3 represents reading of the encrypted personal code stored in data memory 238, and block 338 represents the byte-by-byte comparison of the newly encrypted personal code and the corresponding code recovered from nonvolatile data memory 238, and the setting of a comparison state flag. From block 338, the logic flows to a decision block 340, in which the status of the comparison state flag is evaluated. If the flag indicates that the comparison is imperfect, the logic leaves decision block 340 by the NO output, and reaches a block 352, representing the sending of a message consisting of one or more characters from microprocessor 230 to computer 10, for causing the access display program to display the legend THE APPLICATION YOU HAVE REQUESTED IS NOT AVAILABLE TO YOU: PLEASE REMOVE YOUR ACCESS CONTROL CARD. This advises the person seeking access that he or she has not entered the correct code. From block 352, the logic flows to an END block 354. In this state, the flow chart cannot be continued, and the card must be removed and reinserted to begin again.

If, in decision block 340 of FIG. 3, the state of the comparison flag is such as to indicate that the correct personal code has been entered, the logic leaves decision block 340 by the YES output, and reaches a block 342, which represents the coupling of byte 1 to byte 2 of connector 210 of FIG. 2 within microprocessor 230, whereby keyboard 14 of FIG. 1 can access computer 10. From block 342 of FIG. 3, the logic flows to a further block 344, which represents the sending of a message consisting of one or more characters from microprocessor 230 to computer 10, instructing the access display program to display a screen stating YOU MAY NOW PROCEED and terminate its operation. Alternatively, the character sent from microprocessor 220 may instruct the access display program to end, whereupon it defaults to a menu listing application programs which can be accessed in computer 10. The logic of microprocessor 220 then reaches another interrupt or "wait" state, represented by block 346, in which microprocessor 230 continues to couple the keyboard and the computer together, so that the user can perform all the desired functions. During the period of use, card 34 must remain in the reader. It the card is removed, the keyboard is disconnected from the computer and communications are ended. Once the card is removed, the process is reset to the initial state with no residual information left in computer 10. A party having an unauthorized card, for which he does not know the memorized personal code, cannot insert his card and obtain access to the computer, because his card will not connect the keyboard to the computer in the absence of the correct code. Thus, a lost card does not compromise the trusted computer system.

Eventually, the authorized user will finish using computer 10 of FIG. 1. He may either turn off the computer and remove his card, or he may generate an END message consisting of one or more characters, which is recognized by block 346 of FIG. 3, and which decouples the keyboard from the computer. Even if the card is left in the reader, communications cannot be reestablished between the keyboard and the computer without knowing the personal code for that card. If the computer is turned off and the card is removed, the next authorized cardholder can turn the computer on and initiate use as described above.

If an unauthorized cardholder attempts access, and leaves the computer in the state represented by END block 354 of FIG. 3, with the second access display program displaying the ACCESS DENIED screen, inserting a card anew results in restarting the second access display program when the logic flow of FIG. 3 reaches block 328, and the accessing proceeds as described above.

Other embodiments of the invention will be apparent to those skilled in the art. In the above-described embodiment, access is denied in the event that there is no match of the identification information entered in the step corresponding to blocks 334 and 336 of FIG. 3, but it would be a simple matter to count the number of tries at the NO output of decision block 340, and to erase the card memory ROM when the count reaches a predetermined value after a particular number of retries. Further security may be achieved by requesting further verification by the host computer's more sensitive application programs when a user attempts to open or use such programs. Some or all of the application programs may be preprogrammed to demand authorization of a particular level by interrogating card 34. This might occur, for example, when a user, initially granted access to basic use of the computer as described above, attempts to access a database, for example, the use of which is restricted to a subset of the basic users. If desired, data memory 238 of the card of FIG. 2 may be preloaded with a character representing the level of access which the user is authorized. When access to an application program is commanded by the current user, the accessed application program requests verification of the higher level of clearance. If the level of clearance is already encoded into the card as described above, no further keyboard input is required. When interrogated by an application program for access level, microprocessor 230 of FIG. 2 in turn interrogates its data memory 238, and repeats the information to the computer operating the application program, which can then either accept or deny access, depending on the result of a comparison. A higher level of security can be attained by requiring the keyboard entry of further personal information, which reaches only the card, and which is compared with the information stored therein, to provide (or not provide, as the case may be) the desired verification signals to the applications program to enable it to proceed for use. Even within the application program, the user may request that certain critical information be obtained, or a critical operation performed. The application program may then suspend its normal execution until it establishes that the user is one of those authorized to access the information or perform the operation.

What is claimed is:

1. A trusted computing system, comprising:
   a computing apparatus including a keyboard port, and responsive to keyboard signals applied to said keyboard port;
   a keyboard including a plurality of keys and an output port, for generating, at said output port of said keyboard, keyboard signals representing keystrokes;
   a card reader electrically and mechanically coupled to said output port of said keyboard and to said keyboard port of said computing apparatus, said card reader being for electrically coupling a removable access control card to said keyboard output port and to said keyboard port of said computing apparatus; and
   a plurality of removable access cards, each of which is physically arranged to be mechanically and electrically coupled to said card reader, each of said access cards including memory means preloaded with personal identification information, and comparison means coupled to said memory means, for, when inserted into said card reader, assuming first and second modes of operation, and for, in said first mode of operation, comparing said keyboard signals with said personal identification information, and for, when said comparison matches said keyboard signals with said personal identification information, switching to said second mode of operation, and for, in said second mode of operation, coupling said keyboard signals to said keyboard port of said computing apparatus.

2. A system according to claim 1, wherein said comparison means comprises microprocessor means.

3. A method for providing access to a computer having an external keyboard, comprising the steps of:
   assigning to an authorized user a memory card including a comparator and a memory;
   preloading into said memory of said memory card personal code information known only to said authorized user of said memory card;
   interrupting communications between the keyboard and said associated computer by means of a card reader adapted for accepting said card and other cards assigned to other users;
   inserting said card into said reader and the thereby initiating a communication path between said keyboard and said card;
   entering a personal identification code to said card by way of said keyboard;
   within said card, comparing said personal identification code entered to said card by way of said keyboard with said personal code information preloaded into said memory of said memory card;
   only if said comparing step indicates identity between said personal identification code entered to said card by way of said keyboard and said preloaded personal code information, establishing communications between said keyboard and said computer.

* * * * *